United States Patent [19]

Cygnarowicz et al.

[11] Patent Number: 4,847,793

[45] Date of Patent: Jul. 11, 1989

[54] UPDATING PHYSICAL PROPERTY CORRELATIONS WITH LABORATORY DATA

[75] Inventors: Robert M. Cygnarowicz, Rochester, N.Y.; Arthur J. Lazar; Joseph G. Patella, both of Mentor, Ohio

[73] Assignee: The Babcock & Wilcox Company, New Orleans, La.

[21] Appl. No.: 911,278

[22] Filed: Sep. 24, 1986

[51] Int. Cl.[4] ............... G05B 13/02; G01C 25/00
[52] U.S. Cl. ............... 364/570; 318/600; 364/162; 364/571.05
[58] Field of Search ............... 364/161, 162, 163, 148, 364/567, 570, 571, 728; 318/600, 604

[56] References Cited

U.S. PATENT DOCUMENTS

| | | | |
|---|---|---|---|
| 4,471,447 | 9/1984 | Williams et al. | 364/151 |
| 4,498,036 | 2/1985 | Salemka | 364/148 |
| 4,607,530 | 8/1986 | Chow | 364/571 |
| 4,630,189 | 12/1986 | Ohmori et al. | 364/162 |
| 4,641,235 | 2/1987 | Shigemasa et al. | 364/162 |
| 4,679,136 | 7/1987 | Shigemasa | 364/162 |

FOREIGN PATENT DOCUMENTS

0037579 10/1981 European Pat. Off. ............ 364/148

Primary Examiner—Parshotam S. Lall
Assistant Examiner—Kevin J. Teska
Attorney, Agent, or Firm—Vytas R. Matas; Robert J. Edwards

[57] ABSTRACT

A control logic system for updating physical property correlations. The difference between the calculated valve of a physical property and the laboratory value of the physical property is determined and combined with the previously determined value of the difference to obtain a new value of the correlation bias. Actuation of remote switches by the system operator allows this new value of correlation bias to pass through the control system and be "set" until an updated correlation bias is desired by the operator.

6 Claims, 1 Drawing Sheet

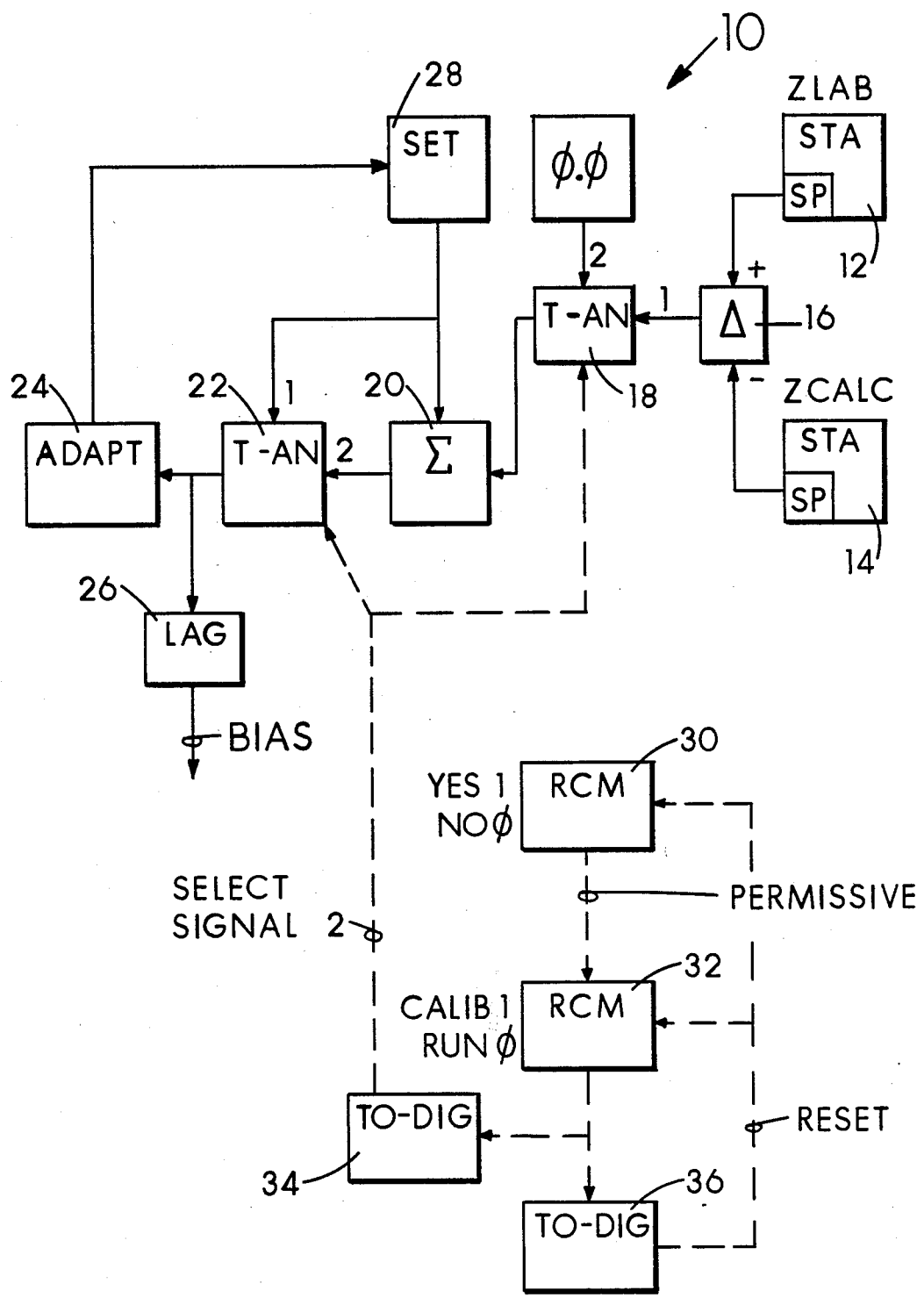

UPDATING PHYSICAL PROPERTY CORRELATIONS WITH LABORATORY DATA

TECHNICAL FIELD

The present invention relates generally to a system for updating physical property correlations used for process control, and more particularly to an updating system utilizing control logic which is an integral part of the process control system.

BACKGROUND ART

Correlations are often used in process control system to determine the value of a physical property. Typically, the correlation is periodically updated from the results of laboratory analysis by utilizing a bias. The conventional updating procedure required calculating the result of the correlation and the current bias, recording the foregoing result, measuring the physical property by laboratory means, calculating a new bias by subtracting the laboratory measurement from the previously recorded calculated result of the correlation, and then tuning the new correlation bias. Thus, the foregoing process involves a number of steps all of which can introduce and/or increase an error in the resulting correlation bias.

Because of the foregoing, it has become desirable to develop a control logic system which eliminates the need for recording the correlation bias so that this bias can be subtracted from the measured value of the physical property being monitored and wherein the control logic can continuously update the correlation bias and is an integral part of the overall control system.

SUMMARY OF THE INVENTION

The present invention solves the aforementioned problems associated with the prior art as well as other problems by providing a system for continuously updating the correlation bias utilized to determine the value of a physical property in a process control system. The control logic system disclosed determines the difference between the calculated value of a physical property and the laboratory value of same and "sums" the difference with the previous value of correlation bias to obtain a new value of correlation bias. This new value of correlation bias can pass through the control system only after the operator has actuated a plurality of remote switches to ensure that faulty data are not accidentally entered into the system. Upon the actuation of the remote switches, the new bias is allowed to pass through the control system and is "set" until the remote switches are again actuated. A reset procedure is inherent in the system thus resetting the remote switches for future actuation by the operator. In this manner, correlation bias can be easily "updated" when desired by the system operator.

BRIEF DESCRIPTION OF THE DRAWINGS

The single figure of the drawing is a schematic diagram representing the control logic system of the present invention.

DESCRIPTION OF THE PREFERRED EMBODIMENT

Referring now to the DRAWING where the illustration is for the purpose of describing the preferred embodiment of the present invention and is not intended to limit the invention hereto, the FIGURE is a schematic diagram of a logic control system 10 for updating physical property correlations with laboratory data.

In the control logic system 10 illustrated in the FIGURE, the laboratory value for a process variable and the corresponding calculated value for this variable are entered into the remote stations 12 and 14, respectively. The outputs of remote stations 12 and 14 are applied to the positive and negative inputs, respectively, to a difference unit 16 whose output is connected to input #1 to an analog transfer station 18. The output of the analog transfer station 18 is connected to an input to a summation unit 20 whose output is connected to the #2 input to an analog transfer station 12. The output of transfer station 22 is connected to an adapt unit 24 and to a lag unit 26. The output of the adapt unit 24 is connected to a set unit 28 whose output is connected an input to the summation unit 20 and to the #1 input to transfer station 22.

A remote switch 30, which is used by the operator to execute an update, is connected to another remote switch 32 that actually executes the update, as hereinafter described. The output of remote switch 32 is connected to the inputs to digital transfer stations 34 and 36. The output of digital transfer station 34 is used to control the operation of analog transfer stations 18 and 22, as hereinafter described. The output of digital transfer station 36 is connected to an input to remote station 30 and provides the reset function for same.

Operationally, the system operator enters the laboratory value of the physical property being measured and the corresponding calculated value of same into remote stations 12 and 14, respectively. The foregoing values are transmitted to the difference unit 16 which performs the difference calculation producing an output which is transmitted to the summation unit 20 via the analog transfer station 18. The summation unit 20 sums the "difference" determined by difference unit 16 with the "old" value of bias presented by set unit 28 to summation unit 20 to obtain a "new" bias for the system. This new or updated bias is not transmitted to the output of the system 10 until the operator initiates the update procedure ensuring that faulty data is not accidentally entered into the system.

The update procedure involves the actuation of remote switches 30 and 32. When an update in the bias is desired, the operator actuates remote switch 32. Actuation of remote switch 32 generates a digital 1 which is converted into a pulse by digital transfer station 34 and transmitted to transfer stations 22 and 18. The application of this pulse to transfer station 22 causes this station to permit the new value of bias to be transmitted therethrough to the system via lag unit 26 and sets the new value of bias in the summation unit 20 by the set unit 28. Similarly, the application of this pulse from transfer station 34 to transfer station 18 causes this latter station to pass an analog zero to the summation unit 20 which is summed with the updated bias.

After the updating process has been completed, the output of transfer station 34 returns to a digital zero which reselects the #1 inputs to the transfer stations 18 and 22 causing the updated bias level to be "locked" into the system. Transfer station 36 performs a timing operation and after a predetermined period of time has elapsed, this transfer station causes the remote switches 30 and 32 to be reset for future actuation when updating is desired. The lag unit 26 is a real-time lag function that dampens the change in bias so that such a change can be gradual so as not to drastically effect the system being controlled.

The foregoing method of updating physical property correlations used for process control can be used whenever the form of the correlation is:

$$z = f(x, y, \ldots) + \text{BIAS}$$

Where
  z = physical property of interest
  X, y, ... = variables on which physical property depends
  BIAS = correlational bias For example, the foregoing approach can be used for continuous on-line process weight (stock balancing). By this approach, the physical property of interest can be monitored and continuously updated. For example, pressure, temperature and specific gravity can be corrected automatically, continuously and accurately without labor intensive data collection as required in the prior art. Thus, continuous online line weight balancing can be easily achieved through the utilization of the foregoing described method.

Certain modifications and improvements will occur to those skilled in the art upon reading the foregoing. It should be understood that all such modifications and improvements have been deleted herein for the sake of conciseness and readability but are properly within the scope of the following claims.

We claim:

1. A system for selectively updating physical property correlations manually with laboratory data comprising, means for entering a measured value of a physical property into the system, means for entering a calculated value of said physical property into the system, means for determining a difference between said measured value and said calculated value of said physical property, and means for selectively combining said difference with a previously determined difference for said physical property to manually produce an additive correlation bias for updating correlations of said physical property.

2. The system as defined in claim 1 further including means for damping said new bias prior to said new bias being transmitted through the system.

3. The system as defined in claim 1 further including means for permitting said bias to be transmitted through the system for updating physical property correlations, said permitting means being actuatable only by a manual operation of the system by an operator to prevent faulty data from entering the system.

4. The system as defined in claim 3 wherein said permitting means comprises at least one switch means.

5. The system as defined in claim 3 further including means for resetting said permitting means after said new bias has been transmitted through the system.

6. The system as defined in claim 3 further including means for preserving said new bias within said system until another bias is subsequently determined and said permitting means is actuated by the operator of the system.

* * * * *